United States Patent [19]

Svarz

[11] 4,179,329

[45] Dec. 18, 1979

[54] REMOVAL OF COLOR FROM PAPER MILL WASTE WATERS

[75] Inventor: Jerry J. Svarz, La Grange, Ill.

[73] Assignee: Nalco Chemical Company, Oak Brook, Ill.

[21] Appl. No.: 647,757

[22] Filed: Jan. 9, 1976

[51] Int. Cl.$^2$ ............................................. D21C 11/00
[52] U.S. Cl. ....................................... 162/29; 210/53; 210/54
[58] Field of Search ................. 162/189, 190, 29, 158, 162/164 R, 72; 210/54 C, 54 R, 53; 260/2 EN

[56] References Cited

U.S. PATENT DOCUMENTS

| | | | |
|---|---|---|---|
| 3,412,018 | 11/1968 | Monzie | 210/54 R |
| 3,640,909 | 2/1972 | Jones et al. | 210/54 C |
| 3,769,116 | 10/1973 | Champeau | 162/189 |

OTHER PUBLICATIONS

McKague, A. B., A.B.I.P.C., vol. 45, No. 10 (Apr. 1975), Abstract 10426.
Clarke, J., A.B.I.P.C., vol. 42, No. 3 (Sep. 1971), Abstract 2727(DU).
Sameshima et al., A.B.I.P.C., vol. 45, No. 2 (Aug. 1974), Abstract 1656.

*Primary Examiner*—S. Leon Bashore
*Assistant Examiner*—George C. Yeung
*Attorney, Agent, or Firm*—Richard L. Johnston

[57] ABSTRACT

Color is removed from paper mill waste water by a precipitation method using relatively small amounts of polyethylene imine as a complexing agent and precipitant for color bodies in such waste waters.

2 Claims, No Drawings

REMOVAL OF COLOR FROM PAPER MILL WASTE WATERS

BACKGROUND

It is generally recognized that the amount of organic material in the form of BOD (biological oxygen demand), COD (chemical oxygen demand), and color bodies currently being discharged into public water supplies from pulp and paper mills is a problem of increasing importance in water pollution.

In the manufacture of paper, cellulose from both hard woods and soft woods is converted to pulp by various processes such as the sulfite process and the sulfate process and the pulp is subjected to various treatments particularly bleaching which involve the use of chemical reagents such as chlorine, chlorine dioxide, sodium hypochlorite and caustic alkalis. As a result of these treatments, the paper making process produces highly colored effluents. The bleaching of the pulp, in particular the caustic extract effluent, is a major contributor to pollution problems.

Lignin is a primary source of color in the pulp. Chlorination of the pulp during the bleaching operation results in the formation of color bodies which are leached from the pulp by caustic alkali solutions. Thus, the caustic extract effluent contains a major proportion of the color bodies and other organic materials which have to be disposed of in waste water treatment.

Several processes are now used or advocated for use in removing color from paper mill waste. One of these is the so-called "massive lime process". This process utilizes lime in quantities ranging from 5,000 to 20,000 parts per million (ppm) to remove by coagulation and sedimentation techniques the organic colored bodies from paper mill wastes.

Another process which is disclosed in U.S. Pat. No. 3,412,018 involves the use of certain types of water insoluble amines in combination with a diluting agent which is non-miscible in water and which has a dielectric constant, measured at 20° C., of less than 4.8 in order to form substantially water insoluble organophilic amine complexes which are extracted by the organic phase. The organic phase is thereafter decanted and separated from the aqueous phase, the amine complex is precipitated from the organic phase and the amine and non-miscible diluting agent are recovered from the organic phase and recycled for further use in the process. This process involves the use of a very substantial amount of the water insoluble amine as well as substantial amounts of organic solvent. Thus, as reported by the patent, the amount of amine employed should be at least 0.5% by volume which would be in excess of 5,000 ppm with respect to the total amount of water treated. The amount of organic solvent is at least 5% by volume with respect to the amount of water treated which would normally correspond to in excess of 50,000 ppm.

The foregoing amine-solvent extraction process has been investigated extensively and is reported to have a number of disadvantages including residual odors from the organic solvents and the tendency for emulsion formation during the treatment and regenerating steps of the process causing excessive loss of amine from the process in the formation of emulsions in the various intermediate steps of the process.

OBJECTS

One of the objects of the present invention is to provide a precipitation process for removal of color bodies from paper mill waste waters and bleachery effluents wherein relatively small amounts of an organic compound are employed and no organic solvent is required.

A further object of the invention is to provide a process of the type described which can be carried out with readily available raw material. Other objects will appear hereinafter.

BRIEF SUMMARY OF THE INVENTION

In accordance with the invention it has been found that color can be removed from paper mill waste waters by adding to such waste waters, preferably at a pH within the range of about 2 to about 7, and in most instances within the range of 2 to 5, a relatively small amount of a polyethylene imine having a molecular weight of at least 300, the amount used being sufficient to form a complex solid of the imine with the color bodies in the waste waters which can be separated by settling or filtration. The amount of the imine can be as low as 10 ppm with respect to the waste water or bleachery effluent and, in most cases, will not exceed 2,000 ppm, depending upon the particular imine employed.

DETAILED DESCRIPTION OF THE INVENTION

The invention is particularly applicable to pulp mill bleachery waste waters which are obtained as a result of bleaching processes applied to the pulp wherein chlorine, chlorine dioxide or sodium hypochlorite are employed and the pulp is treated with caustic alkali solutions (i.e., sodium hydroxide solutions) which extract the color bodies and produce a highly colored effluent. It is essential for the purpose of the process that the pH of this effluent be reduced to a pH within the range of 2 to 7 and preferably around 2.5 to 5.0. In a typical paper mill plant the waste waters from the whole mill might total 25,000,000 to 30,000,000 gallons per day and the bleachery waste waters would constitute a smaller proportion of the total, say, 1,000,000 to 6,000,000 gallons per day. The present invention can be used to treat all of the waste waters but it is usually more practical and more essential to treat the bleachery waste waters in order to remove or to reduce to a minimum the color bodies therein.

The present invention is based on the discovery that relatively small amounts of imines of the type previously mentioned will combine with the color bodies in the aforementioned waste waters under certain pH conditions to form a water insoluble solid and that the resultant imine-color body solids can be removed by settling or filtration.

It appears to be essential for the purpose of the present invention that the imines employed have an average molecular weight of at least 300. The polyethylene imines are available commercially as PEI 3, PEI 6, and PEI 18 with average molecular weights of 300, 600 and 1800, respectively. They are normally water soluble and can be used as aqueous solutions. Higher molecular weight imines can be used. Inasmuch as the reaction with the color body apparently occurs at the imino

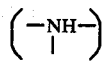

group, it is deemed to be immaterial whether the imine itself is water soluble or water insoluble.

In carrying out the process the pH can be achieved by blending acidic chlorination effluent from the bleachery process with caustic extraction effluent or the caustic extraction effluent can be acidified with sulfuric acid or waste liquor containing sulfuric acid, or hydrochloric acid.

The invention has been evaluated by treating the waste waters with the imine, removing the resultant solids and comparing the clarified effluent or filtrate with the waste water prior to treatment. This comparison was carried out in two ways, (1) using a Gardner Holt colorimeter and observing the readings, and (2) obtaining color readings in terms of APHA units. The treated samples were centrifuged or filtered through No. 40 filter paper to remove floc and the filtrates or centrifugates were adjusted to pH 7 before color readings were taken. The raw effluents used in the test were adjusted to pH 7 and then filtered through a millipore filter before color readings were made to get a base line reading on original color.

The treatment of the waste water with the imine can be supplemented by a subsequent addition of a water insoluble amine containing at least eight carbon atoms, preferably 8 to 24 carbon atoms, in the hydrocarbon group linked to the amino group, e.g., oleyl amine.

The invention will be further illustrated but is not limited by the following examples in which the quantities are given by weight unless otherwise indicated.

EXAMPLE I

A soft wood bleachery caustic alkali extract was acidified with hydrochloric acid to give a pH of approximately 3 and then treated with 400 ppm of polyethylene imine having an average molecular weight of 300 (PEI 3). The Gardner color was reduced from 18 to 12. The temperature used in this test was 40° C. Other tests were carried out at ambient temperatures of 20°–25° C. with generally similar results in color reduction.

Subsequent additions of 300 ppm of oleyl amine reduced the Gardner color to 5.

EXAMPLE II

Samples of various types of paper mill waste waters were tested using 500 ml samples to which a polyethylene imine was added at various pH's and in various proportions. The samples were stirred at ambient temperatures at 100–120 rpm for 2 minutes and at 40 rpm for 2 minutes. Color and clarity on the APHA color scale on a Hellige instrument was determined. Readings were made after cup centrifuging at the treated pH and then again at pH 7.0 after adjustment. Usually color values go up 20 APHA units at pH 7.0. The additives were all added as solutions in water diluted to a 1% concentration of the polyethylene imine.

In one series of tests the bleachery caustic extract had an APHA value of 500 and a pH of 9.1. The addition of polyethylene imine having an average molecular weight of 1800 (PEI-18 Dow) at a dosage of 50 ppm reduced the APHA color to 20. At dosages of 30 ppm and 10 ppm there was no reduction in the APHA color.

The same polyethylene imine at dosages of 50 ppm, 30 ppm and 10 ppm and at a pH of 5 in each case reduced the APHA color of the sample from 500 to 20, 30 and 120, respectively.

The same polyethylene imine at dosages of 50 ppm, 30 ppm and 10 ppm and at a pH of 7 reduced the APHA color from 500 to 60, and 200 APHA in the case of the 50 ppm dosage and the 30 ppm dosage, respectively. A dosage of 10 ppm at pH 7 produced no reduction in the APHA color and no floc formation.

The same polyethylene imine at dosages of 50 ppm, 30 ppm and 10 ppm and at a pH of 3 reduced the APHA color from 500 to 40, 50 and 60, respectively.

EXAMPLE III

The procedure was the same as in Example II except that polyethylene imine having an average molecular weight of 600 was used. At dosages of 50 ppm, 30 ppm and 10 ppm and a pH of 3, the APHA color was reduced to 40 and the floc formation was good except at the 10 ppm dosage where it was fairly good.

In carrying out the process it is also possible to acid-extract the precipitated sludge and recover a portion of the imine which can then be recycled in the process. Inasmuch as the amounts of imine employed are relatively small, this is not always practical.

It should be understood that the proportions of the various additives may vary to some extent depending upon the composition of the particular paper mill waste water. The process is particularly useful for removing color from softwood and hardwood paper pulp bleachery effluents where the content of color bodies is relatively high. It may not always be practical from an economical standpoint to use the process on the total effluent. The treatment can also be used not only for the purpose of reducing color in paper pulp waste water but also for reducing total solids and for reducing total suspended solids.

The invention is hereby claimed as follows:

1. A process for removing color from cellulose paper pulp bleachery effluent waste waters wherein color bodies are present due to chemical reaction on or degradation of lignin which comprises adjusting the pH of said waste waters to a pH within the range of 2 to 7, mixing with the resultant waste waters a polyethylene imine having an average molecular weight of 300 to 1800, the amount of said imine being within the range of 10 to 2000 ppm of said waste waters and being sufficient to combine with said color bodies to form water insoluble solids, subsequently adding to said waste waters an amine having at least one hydrocarbon group containing from 8 to 24 carbon atoms linked to amino nitrogen without organic solvent, and separating the resultant solids.

2. A process as claimed in claim 1 in which said amine is oleyl amine.

* * * * *